United States Patent
Xu

(10) Patent No.: US 12,412,543 B1
(45) Date of Patent: Sep. 9, 2025

(54) HAIR STRAIGHTENING BRUSH WITH TFT-LCD

(71) Applicant: Weiping Xu, Jiangxi (CN)

(72) Inventor: Weiping Xu, Jiangxi (CN)

( * ) Notice: Subject to any disclaimer, the term of this patent is extended or adjusted under 35 U.S.C. 154(b) by 0 days.

(21) Appl. No.: 19/218,534

(22) Filed: May 26, 2025

(51) Int. Cl.
| | |
|---|---|
| G09G 3/36 | (2006.01) |
| A45D 2/00 | (2006.01) |
| G06T 11/00 | (2006.01) |
| G06T 11/20 | (2006.01) |
| G09G 3/20 | (2006.01) |
| G09G 3/32 | (2016.01) |
| G09G 3/34 | (2006.01) |
| G02F 1/1368 | (2006.01) |

(52) U.S. Cl.
CPC ........... *G09G 3/3648* (2013.01); *A45D 2/002* (2013.01); *G06T 11/001* (2013.01); *G06T 11/203* (2013.01); *G09G 3/2092* (2013.01); *G09G 3/32* (2013.01); *G09G 3/3426* (2013.01); *G02F 1/1368* (2013.01); *G09G 2300/0842* (2013.01); *G09G 2320/064* (2013.01)

(58) Field of Classification Search
CPC ...... G09G 3/3648; G09G 3/2092; G09G 3/32; G09G 3/3426; G09G 2320/064; G09G 2300/0842; A45D 2/002; G02F 1/1368; G06T 11/001; G06T 11/203
See application file for complete search history.

(56) References Cited

U.S. PATENT DOCUMENTS

2013/0133218 A1 * 5/2013 Hadden .................. A45D 20/10
34/97

FOREIGN PATENT DOCUMENTS

WO    WO-2022179129 A1 * 9/2022

* cited by examiner

*Primary Examiner* — Wesner Sajous
(74) *Attorney, Agent, or Firm* — Justin Lampel

(57) ABSTRACT

A hair straightening brush with a thin film transistor-liquid crystal display (TFT-LCD) includes a head part and a handheld part. The head part includes a first housing, metal heat-conducting teeth, and an electric heating component. The handheld part includes a second housing, and a main control unit. The electric heating component is electrically connected to the main control unit. A display module is further disposed in the second housing, is provided with a display (TFT-LCD), and is electrically connected to the display. The display module includes a driver circuit and a signal control module, and is configured to generate timing signals for controlling row and column drivers of the display. The driver circuit is configured to: receive the timing signals for controlling the row and column drivers, convert the timing signals into row and column driver analog voltages, output the analog voltages to the display, and control liquid crystal alignment of the display.

9 Claims, 1 Drawing Sheet

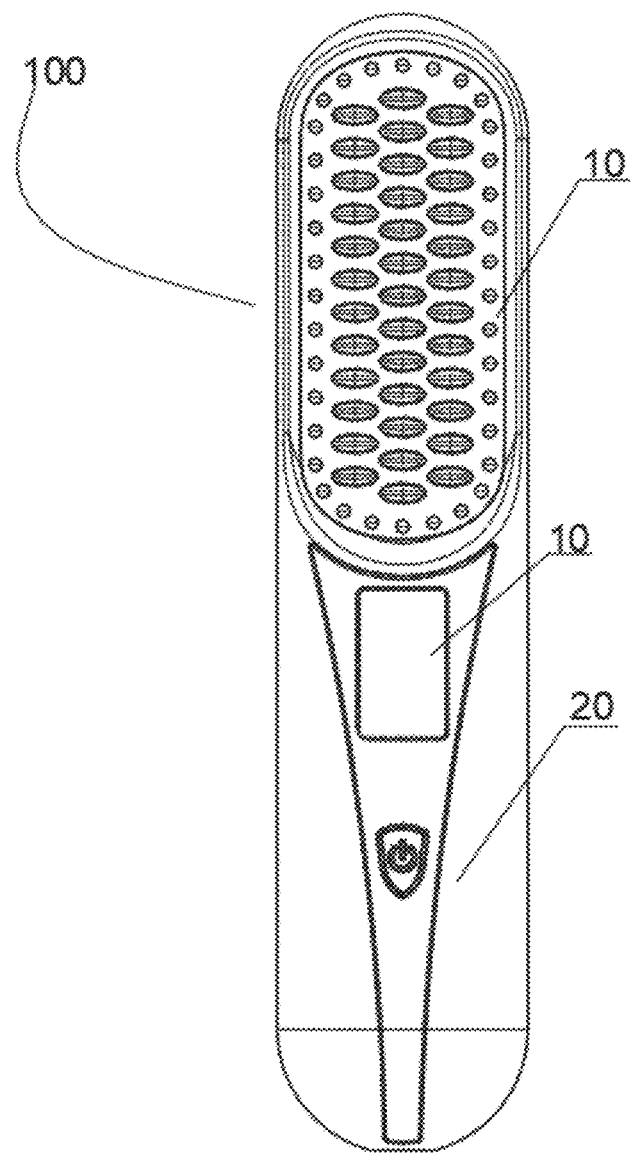

HAIR STRAIGHTENING BRUSH WITH TFT-LCD

TECHNICAL FIELD

This application relates to daily supplies, and in particular, relates to a hair straightening brush with a thin film transistor-liquid crystal display (TFT-LCD).

BACKGROUND

In the conventional technology, hairbrushes serve as one of the most common tools for consumers to style hair. In daily life, to achieve a more polished look and voluminous texture after brushing, consumers often need to straighten curly hair, which can be easily achieved using a hair straightening brush. Hair is styled by the hair straightening brush at a proper temperature achieved by electrical heating. The hair straightening brush needs to be preheated before use, and only can be used at a specific temperature. However, during preheating, only fixed content, for example, a temperature can be displayed by a hair straightening brush in the conventional technology, and consequently, high-definition display and animated visual effects cannot be achieved.

SUMMARY

To resolve the foregoing problems, embodiments of this application provide a hair straightening brush with a thin film transistor-liquid crystal display (TFT-LCD), to overcome or at least partially overcome disadvantages in the conventional technology.

Embodiments of this application provide a hair straightening brush with a TFT-LCD, including a head part and a handheld part, where the head part includes a first housing, metal heat-conducting teeth, and an electric heating component mounted in the first housing; the handheld part includes a second housing, and a main control unit mounted in the second housing; the electric heating component is electrically connected to the main control unit; a display module is further disposed in the second housing; the display module is provided with a display on a surface of the second housing, and the display module is electrically connected to the display; and the display module includes a driver circuit, and a signal control module; and the display is a TFT-LCD;

the signal control module is configured to generate, according to an input signal, timing signals for controlling row and column drivers of the display; and the input signal is input image data; and the driver circuit is configured to: receive the timing signals for controlling the row and column drivers that are output by a timing controller, respectively convert the timing signals for controlling the row and column drivers into row and column driver analog voltages, output the row and column driver analog voltages to the display, and control liquid crystal alignment of the display by using the row and column driver analog voltages.

In an embodiment, the main control unit is electrically connected to the signal control module; and the main control unit is configured to: perform size adjustment and rendering on an input font to obtain deformed and rendered fonts, convert the deformed and rendered fonts into red, green and blue (RGB) pixel data, and transmit the RGB pixel data to the signal control module, where the RGB pixel data is the input signal of the signal control module.

In an embodiment, a font rendering module is integrated in the main control unit; and the font rendering module includes a font parsing engine and a vector font library, where bitmap fonts of different sizes are prestored in the vector font library, the font rendering module is configured to extract outlines of the bitmap fonts from the vector font library, the font parsing engine is configured to adjust a length, width and height of the input font by using a length, width and height adjusting algorithm to form a deformed font, or the font parsing engine is configured to optimize edges by using a bilinear interpolation algorithm or an anti-aliasing algorithm to form a rendered font, where the deformed and rendered fonts include the deformed font and the rendered font.

In an embodiment, when the driver circuit is configured to respectively convert the timing signals for controlling the row and column drivers into row and column driver analog voltages, the driver circuit is specifically configured to:

convert the gate driver signal for controlling the row driver into a row driver voltage signal, and convert the source driver signal for controlling the column driver into a column driver voltage signal, where the row driver voltage signal is a source voltage signal of a TFT pixel unit, and the row driver voltage signal is a gate voltage signal of the TFT pixel unit; and the timing signal for controlling the row driver is a gate driver signal, and the timing signal for controlling the column driver is a source driver signal.

In an embodiment, a plurality of TFT pixel units of the display are configured to form a TFT array substrate, and the display includes an upper polarizer, a color filter, a liquid crystal layer, the TFT array substrate, a lower polarizer, and a backlight assembly from top to bottom.

In an embodiment, the backlight assembly is further provided with a backlight control module that has a plurality of LED arrays, the LED arrays are divided into a plurality of independently controlled LED zones, and pulse amplitude modulation (PWM)/pulse width modulation (PAM) hybrid dimming is adopted in each LED zone.

In an embodiment, each TFT pixel unit includes one TFT transistor and a pixel capacitor, the one TFT transistor is used as a switch to control charging and discharging of the pixel capacitor, and the pixel capacitor is configured to: store image data, and control liquid crystal alignment of the backlight assembly by adjusting the row and column driver analog voltages.

In an embodiment, the hair straightening brush is a smart appliance, and is paired with a mobile phone APP, making a user input an arbitrary glyph via a mobile phone during operation.

In an embodiment, the driver circuit includes a source driver circuit and a gate driver circuit, the source driver circuit is configured to receive the source driver signal sent by the signal control module, and the gate driver circuit is configured to receive the gate driver signal sent by the signal control module.

At least one of the foregoing technical solutions adopted in the embodiments of the present application can achieve the following beneficial effects:

According to this application, displaying of the display is clear with resolution of at least 256*256, and a length, width, and height of a text can be edited by inputting any font. According to this application, a contrast of the display is co-adjusted through light modulation of liquid crystal molecules, dynamic control of a backlight brightness, coordinated control of the light modulation and the dynamic control, and the like. Therefore, a font change can be achieved through the display, and a gorgeous animation effect can be displayed.

BRIEF DESCRIPTION OF THE DRAWINGS

The accompanying drawings described herein are provided for further understanding of this application, and constitute a part of this application. The exemplary embodiments of this application and illustrations thereof are intended to explain this application, but do not constitute inappropriate limitations to this application. In the accompanying drawings:

FIG. 1 is a schematic diagram of a structure of a hair straightening brush with a TFT-LCD according to an embodiment of this application.

DETAILED DESCRIPTION OF THE EMBODIMENTS

To make the objective, technical solutions, and advantages of this application clearer, the technical solutions in this application are clearly and completely described below with reference to specific embodiments and corresponding accompanying drawings of this application. Apparently, the described embodiments are some rather than all of the embodiments of this application. All other embodiments obtained by a person of ordinary skill in the art based on the embodiments of this application without creative efforts shall fall within the protection scope of this application.

The technical solutions provided in the embodiments of this application are described in detail below with reference to the accompanying drawings.

As shown in FIG. 1, this application discloses a hair straightening brush 100 with a thin film transistor-liquid crystal display (TFT-LCD), including a head part 10 and a handheld part 20. The head part includes a first housing, metal heat-conducting teeth, and an electric heating component mounted in the first housing. The handheld part includes a second housing, and a main control unit mounted in the second housing. The electric heating component is electrically connected to the main control unit. A display module is further disposed in the second housing. The display module is provided with a display 30 on a surface of the second housing, and the display module is electrically connected to the display. The display module includes a driver circuit, and a signal control module; and the display is a TFT-LCD.

The signal control module is configured to generate, according to an input signal, timing signals for controlling row and column drivers of the display, where the input signal is input image data.

The driver circuit is configured to: receive the timing signals for controlling the row and column drivers that are output by the timing controller, respectively convert the timing signals for controlling the row and column drivers into row and column driver analog voltages, output the row and column driver analog voltages to the display, and control liquid crystal alignment of the display by using the row and column driver analog voltages.

The display in this application is the TFT-LCD. The TFT-LCD includes a TFT pixel unit, and a backlight assembly. The display module includes a driver circuit, and a signal control module.

The backlight assembly is a key part for providing a light source for the TFT display, and includes an LED strip, a light guide plate, a diffusion plate, a light reflective film, and the like. The backlight module is configured to provide a uniform light source, making liquid crystal molecules correctly adjust light transmittance according to a voltage change, to ensure that each pixel can correctly display color. The driver circuit is configured to drive the TFT pixel unit, achieving high-quality image output of the LCD. The driver circuit in this application adopts a simple single-panel layout with low costs, and is suitable for small-size and simple application.

The TFT-LCD in this application is a thin film transistor-liquid crystal display. The English full name of the TFT-LCD is thin film transistor-liquid crystal display. A difference between the TFT-LCD and a simple matrix of a twisted nematic liquid crystal display (TN-LCD) or a super twisted nematic liquid crystal display (STN-LCD) lies in that a film transistor (TFT) is disposed on each pixel of the liquid crystal display. This can effectively overcome crosstalk during non-gating, making static characteristics of the liquid crystal display be irrelevant to a number of scanning lines, and greatly improving image quality. The TFT-LCD is also referred to as a true-color liquid crystal display.

In a thin film transistor (TFT) display technology, each pixel is driven by a film transistor, to achieve a higher pixel switching response speed and more precise color reproduction. Each pixel is controlled by an independent TFT, and therefore, high resolution can be achieved in the TFT display technology. Compared with an inactive matrix technology, TFT has higher response speed, making displaying of a dynamic image be smoother.

The TFT-LCD in this application can achieve dynamic menu transitions, fluid animations, and vibrant visual effects.

The signal control module in this application is a timing controller (TCON). The TCON is configured to generate, according to an input signal, timing signals for controlling row and column drivers. The input signal is image data of the main control unit.

The driver circuit is configured to: receive the timing signals for controlling the row and column drivers that are output by the timing controller, respectively convert the timing signals for controlling the row and column drivers into row and column driver analog voltages, output the row and column driver analog voltages to the display, and control liquid crystal alignment of the display by using the row and column driver analog voltages.

Each TFT pixel unit includes one TFT transistor and a pixel capacitor (Cs). The one TFT transistor is used as a switch to control charging and discharging of the pixel capacitor, and the storage capacitor is configured to: store image data, and control liquid crystal alignment by adjusting the row and column driver analog voltages (namely, a gate voltage (Vgh/Vgl) and a source voltage (Vs)), to change the light transmittance (gray level). A manner in which the liquid crystal molecules are arranged is changed according to a change of a stored voltage to determine amount of transmitted light, achieving displaying at different gray levels. In a working process, when the transistor is an on state, the pixel capacitor (Cs) starts to charge, making a voltage value of the pixel capacitor change according to a change of a drive signal. Once charging is ended, the transistor is turned off, to maintain the voltage value of the pixel capacitor until next refresh. The light transmittance of light is determined by the direction in which the liquid crystal molecules are arranged, to determine a pixel display brightness.

The main control unit has a main control chip. For example, the main control chip may be a system-on-chip (SOC), a central processing unit (CPU), a graphics processing unit (GPU), or the like. The main control unit is configured to: perform size adjustment and rendering on an input font to obtain deformed and rendered fonts, convert the deformed and rendered fonts into red, green and blue (RGB) pixel data, and transmit the RGB pixel data to the signal control module, where the RGB pixel data is the input signal of the signal control module.

A font rendering module in this application is integrated in the main control unit. The font rendering module includes a font parsing engine and a vector font library, where bitmap fonts of different sizes are prestored in the vector font library. The font rendering module is configured to extract outlines of the bitmap fonts from the vector font library, adjust a length, width and height of the input font by using a length, width and height adjusting algorithm to form a deformed font. Alternatively, the font parsing engine is configured to optimize edges by using a bilinear interpolation algorithm or an anti-aliasing algorithm (for example, a reetype library) to form a rendered font, where the deformed and rendered fonts include the deformed font and the rendered font. Alternatively, the font parsing engine is configured to first adjust the length, width and height of a font and then perform font rendering. This is not limited in this application. Glyph data of the rendered font or deformed font is converted into RGB pixel data (for example, a RGB pixel value) for sending to the timing controller TCON.

The TFT-LCD in this application has resolution of 256*256. Clear display with 0.14 mm pixel pitch can be achieved through the 256*256 TFT-LCD. The main control unit can be configured to convert the glyph data of the rendered font or deformed font into 256*256 RGB pixel data.

For example, the glyph data of the deformed font includes a font size, an aspect ratio, and the like. A font is specifically stretched (for example, from 1 pixel to 1.5 pixels) through pixel repetition and interpolation in the horizontal direction. A font is compressed through vertical pixel sampling.

The timing controller TCON in this application is configured to perform dynamic timing adjustment according to the RGB pixel data to generate timing signals for controlling row and column drivers. The timing signals include a source driver signal and a gate driver signal. Precise pixel addressing and voltage witting can be achieved through combination of the source driver signal and the gate driver signal. The timing signal for controlling the row driver is a gate driver signal, and the timing signal for controlling the column driver is a source driver signal. The gate driver signal is used to control when a pixel is written, and the source driver signal is used to control what value is written to the pixel. The timing controller TCON is configured to ensure strict synchronization between the source driver signal and the gate driver signal, achieving high image quality (a high contrast ratio and a high refresh rate) and low power consumption. The timing controller TCON is configured to distribute image data to a plurality of source drivers.

The driver circuit is configured to: receive the timing signals for controlling the row and column drivers that are sent by the timing controller TCON, and generate a drive voltage signal according to the timing signals for controlling the row and column drivers. The driver circuit includes a source driver circuit (source driver) and a gate driver circuit (gate driver). The source driver circuit is configured to receive the source driver signal sent by the TCON, and the gate driver circuit is configured to receive the gate driver signal sent by the TCON. The source driver is configured to receive deformed pixel data sent by the timing controller TCON to precisely output an analog voltage. The gate driver cooperates with the timing controller TCON to adjust row scanning timing to adapt to a row height of a deformed font.

In this application, that the timing signals for controlling the row and column drivers are respectively converted into row and column driver analog voltages, and the row and column driver analog voltages are output to the display further includes the following steps.

The gate driver signal for controlling the row driver is converted into a row driver voltage signal, and the source driver signal for controlling the column driver is converted into a column driver voltage signal. In this application, the row driver voltage signal is a source voltage (Vs) signal of the TFT pixel unit (row scanning for short). The row driver voltage signal is a gate voltage signal of the TFT pixel unit (column scanning for short). Liquid crystal alignment is controlled by adjusting the gate voltage (Vgh/Vgl) and the source voltage (Vs), to change the light transmittance (gray level).

The row scanning refers to turning on switches of the TFT transistor row by row, to charge charging time of the pixel capacitor. More specifically, gate voltages (VGH) of each row of TFT transistors are sequentially activated, to control the TFT transistors of all pixels in the row to be conducted, allowing a row driver voltage to be written to the pixels. The pixel capacitor is configured to maintain a pixel voltage of the pixel capacitor (Cs) during a turn-off period of the TFT, and reduce brightness attenuation.

The column scanning refers to writing a pixel voltage by applying a precise analog voltage to each sub-pixel (RGB) through a source of the TFT transistor during column scanning, to control an alignment angle of the liquid crystal molecules. Precise gray-level voltages are applied to TFTs of each row of pixels through the source driver circuit (source driver), to control the alignment angle of the liquid crystal molecules, and finally adjust the light transmittance. The gray-level voltage is implemented to convert digital image data into an analog voltage.

A plurality of TFT pixel units of the TFT-LCD in this application are configured to form a TFT array substrate. The backlight assembly is physically isolated from the TFT substrate through an optical film (for example, the diffusion plate). The TFT-LCD in this application includes an upper polarizer, a color filter (CF), a liquid crystal layer (LC), the TFT array substrate, a lower polarizer, and a backlight assembly from top to bottom.

Each TFT pixel unit in this application has a TFT transistor and one pixel capacitor. Each TFT pixel unit can be independently controlled through the timing controller. The backlight assembly includes a light guide plate, and an LED array, and is configured to provide uniform white light. The backlight assembly cooperates with the TFT pixel unit to achieve a display effect with a high contrast (for example, 1000:1) and quick response (for example, 5 ms GTG).

A direct LED (direct LED) backlight technology and an edge LED (edge LED) backlight technology that are emerged can be adopted in this application. In the edge LED backlight design, the LED array is disposed on an edge of the light guide plate. In the direct LED backlight (Direct LED) design, the LED array is uniformly distributed on the light guide plate (to achieve local dimming). The direct LED backlight technology and the edge LED backlight module have respective advantages in display effect and energy consumption.

According to this application, a contrast of the display is co-adjusted through light modulation of liquid crystal molecules, dynamic control of a backlight brightness, coordinated control of the light modulation and the dynamic control, and the like. Therefore, a font change can be achieved through the display, and a gorgeous animation effect can be displayed.

The backlight assembly in this application further has a backlight control module. The backlight control module is configured to dynamically adjust a brightness according to image content. Specifically, an LED array of the backlight assembly is divided into a plurality of independently controlled LED zones, for example, 16×8 zones. Pulse amplitude modulation (PWM)/pulse width modulation (PAM) hybrid dimming is adopted in each LED zone.

The backlight control module in this application further has a brightness adjustment algorithm sub-module. The brightness adjustment algorithm sub-module is configured to extract a maximum brightness value of each zone of an image, to eliminate halos in combination with diffusion filtering. Hybrid PWM/PAM dimming, including PWM dimming synchronization, is adopted in each LED zone. The PWM dimming synchronization is implemented if a backlight PWM frequency is greater than a preset frequency, and is synchronized with a frame rate of the TCON. A dedicated driver integrated circuit (IC) (for example, LP8556 of TI) is used to support a self-adaptive synchronization signal. A PWM dimming duty cycle is matched with gray-level data, to avoid brightness jump.

The display module in this application can be configured to enable menu variations, secondary menu creation, animation production, and the like. An improved display module can be configured to enable menu variations and vibrant animations, creating an intuitive effect for guiding to correctly operate the product in use. The TFT-LCD is used on a negative-ion hair straightening brush, and is a product that is not on the market as there are technical barriers. Menu indication for a conventional product is mainly achieved through a digital screen and an LED lamp, and therefore, a display effect is poor.

The hair straightening brush in this application is a smart appliance, and is paired with a mobile phone APP. A user inputs an arbitrary glyph, for example, inputs a word "GOOD" to the main control unit via a mobile phone through Unicode encoding, or the like. A corresponding font is queried by the main control unit from the vector font library. A vector/bitmap and parameters of a length, width and height are adjusted by the font parsing engine, to ultimately generate a rendered font and convert the rendered font into RGB pixel data. The TFT-LCD in this application implements a digital display through TFT pixel units, enabling both the inputting of arbitrary font types and editing of text dimensions (length, width, and height).

Dynamic menu transitions, fluid animations, and vibrant visual effects can be achieved by the TFT-LCD in this application. According to this application, a refresh rate of the timing controller TCON is increased to a recommended value of 60 Hz.

Those skilled in the art should understand that the embodiments of the present application may be provided as a method, a system, or a computer program product. Therefore, the present application can take the form of an entire hardware embodiment, an entire software embodiment, or an embodiment combining software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The above are merely preferred embodiments of the present application, and are not intended to limit the present application. Various changes and modifications can be made to the present application by those skilled in the art. Any modifications, equivalent replacements, and improvements made within the spirit and principle of the present application should be included within the protection scope of the claims of the present application.

What is claimed is:

1. A hair straightening brush with a thin film transistor-liquid crystal display (TFT-LCD), comprising a head part and a handheld part, wherein the head part comprises a first housing, metal heat-conducting teeth, and an electric heating component mounted in the first housing; the handheld part comprises a second housing, and a main control unit mounted in the second housing; the electric heating component is electrically connected to the main control unit; a display module is further disposed in the second housing; the display module is provided with a display on a surface of the second housing, and the display module is electrically connected to the display; the display module comprises a driver circuit, and a signal control module; and the display is a TFT-LCD; and the signal control module is configured to generate, according to an input signal, timing signals for controlling row and column drivers of the display; and the input signal is input image data; and the driver circuit is configured to: receive the timing signals for controlling the row and column drivers that are output by a timing controller, respectively convert the timing signals for controlling the row and column drivers into row and column driver analog voltages, output the row and column driver analog voltages to the display, and control liquid crystal alignment of the display by using the row and column driver analog voltages.

2. The hair straightening brush with a TFT-LCD according to claim 1, wherein the main control unit is electrically connected to the signal control module; and the main control unit is configured to: perform size adjustment and rendering on an input font to obtain deformed and rendered fonts, convert the deformed and rendered fonts into red, green and blue (RGB) pixel data, and transmit the RGB pixel data to the signal control module, wherein the RGB pixel data is the input signal of the signal control module.

3. The hair straightening brush with a TFT-LCD according to claim 2, wherein a font rendering module is integrated in the main control unit; and the font rendering module comprises a font parsing engine and a vector font library, wherein bitmap fonts of different sizes are pre-stored in the vector font library, the font rendering module is configured to extract outlines of the bitmap fonts from the vector font library, the font parsing engine is configured to adjust a length, width and height of the input font by using a length, width and height adjusting algorithm to form a deformed font, or the font parsing engine is configured to optimize edges by using a bilinear interpolation algorithm or an anti-aliasing algorithm to form a rendered font, wherein the deformed and rendered fonts comprise the deformed font and the rendered font.

4. The hair straightening brush with a TFT-LCD according to claim 1, wherein when the driver circuit is configured to respectively convert the timing signals for controlling the row and column drivers into the row and column driver analog voltages, the driver circuit is specifically configured to:

convert the gate driver signal for controlling the row driver into a row driver voltage signal, and convert the source driver signal for controlling the column driver into a column driver voltage signal, wherein the row driver voltage signal is a source voltage signal of a TFT pixel unit, and the row driver voltage signal is a gate voltage signal of the TFT pixel unit; and the timing signal for controlling the row driver is a gate driver signal, and the timing signal for controlling the column driver is a source driver signal.

5. The hair straightening brush with a TFT-LCD according to claim 1, wherein a plurality of TFT pixel units of the display are configured to form a TFT array substrate, and the display comprises an upper polarizer, a color filter (CF), a liquid crystal (LC) layer, the TFT array substrate, a lower polarizer, and a backlight assembly from top to bottom.

6. The hair straightening brush with a TFT-LCD according to claim 5, wherein the backlight assembly is further provided with a backlight control module that has a plurality of LED arrays, the LED arrays are divided into a plurality of independently controlled LED zones, and pulse amplitude modulation (PWM)/pulse width modulation (PAM) hybrid dimming is adopted in each LED zone.

7. The hair straightening brush with a TFT-LCD according to claim 5, wherein each TFT pixel unit comprises one TFT transistor and a pixel capacitor, the one TFT transistor is used as a switch to control charging and discharging of the pixel capacitor, and the storage capacitor is configured to: store image data, and control liquid crystal alignment of the backlight assembly by adjusting the row and column driver analog voltages.

8. The hair straightening brush with a TFT-LCD according to claim 7, wherein the hair straightening brush is a smart appliance, and is paired with a mobile phone APP, making a user input an arbitrary glyph via a mobile phone during operation.

9. The hair straightening brush with a TFT-LCD according to claim 4, wherein the driver circuit comprises a source driver circuit and a gate driver circuit, the source driver circuit is configured to receive the source driver signal sent by the signal control module, and the gate driver circuit is configured to receive the gate driver signal sent by the signal control module.

\* \* \* \* \*